US012042932B2

(12) United States Patent
Roulet-Dubonnet et al.

(10) Patent No.: US 12,042,932 B2
(45) Date of Patent: Jul. 23, 2024

(54) ROBOT PICKING ASSEMBLY

(71) Applicant: SOLWR ROBOTICS AS, Ålesund (NO)

(72) Inventors: Olivier Roulet-Dubonnet, Trondheim (NO); Torbjørn Vestnes Krogen, Ålesund (NO)

(73) Assignee: SOLWR Robotics AS, Ålesund (NO)

( * ) Notice: Subject to any disclaimer, the term of this patent is extended or adjusted under 35 U.S.C. 154(b) by 954 days.

(21) Appl. No.: 16/769,540

(22) PCT Filed: Dec. 6, 2018

(86) PCT No.: PCT/EP2018/083774
§ 371 (c)(1),
(2) Date: Jun. 3, 2020

(87) PCT Pub. No.: WO2019/110724
PCT Pub. Date: Jun. 13, 2019

(65) Prior Publication Data
US 2020/0353630 A1 Nov. 12, 2020

(30) Foreign Application Priority Data

Dec. 6, 2017 (NO) .................................... 20171938

(51) Int. Cl.
*B25J 18/02* (2006.01)
*B66F 7/06* (2006.01)
(Continued)

(52) U.S. Cl.
CPC ............ *B25J 18/02* (2013.01); *B25J 18/025* (2013.01); *B66F 7/065* (2013.01); *B66F 9/061* (2013.01);
(Continued)

(58) Field of Classification Search
CPC . B25J 18/02; B25J 18/025; B25J 18/06; B25J 18/04; F16G 13/20; F16H 19/0636
(Continued)

(56) References Cited

U.S. PATENT DOCUMENTS

| 4,502,830 A * | 3/1985 | Inaba ...................... B25J 18/02 901/17 |
| 4,830,337 A | 5/1989 | Ichiro et al. |
| 5,533,858 A * | 7/1996 | Costa ...................... B25J 9/023 74/490.09 |
| 10,131,058 B2 * | 11/2018 | Yoon ...................... B25J 18/02 |
| 2006/0250587 A1 * | 11/2006 | Grasser ................ G03B 21/005 353/99 |

(Continued)

FOREIGN PATENT DOCUMENTS

| EP | 3117970 A1 | 1/2017 |
| EP | 3238891 A1 | 11/2017 |

(Continued)

OTHER PUBLICATIONS

Faymann, L; International Search Report; PCT/EP2018/083774; dated Apr. 2, 2019; 3 pages.

*Primary Examiner* — Mahdi H Nejad
(74) *Attorney, Agent, or Firm* — Bradley Arant Boult Cummings LLP

(57) ABSTRACT

A robotic picking assembly (100) comprising an arm support arrangement (8) configured to move vertically and to rotate about a vertical axis. A horizontally extendable arm (1) is supported in the arm support arrangement. A gripping tool (20) arranged at a free end (1a) of the arm. The arm comprises arm modules (2) linked together in a chain. The arm modules (2) have a pivot means (4) linking adjacent arm modules together in a pivoting manner and a pivot restriction means (15, 16, 18, 19) limiting curving of the arm to only one direction. The arm support arrangement (8) has an arm guiding arrangement (25, 21, 21a, 21b, 33) guiding the arm between an extended position and a retracted position, and an arm drive arrangement (7) configured to move the arm between said extended and retracted positions.

20 Claims, 14 Drawing Sheets

(51) Int. Cl.
  *B66F 9/06* (2006.01)
  *B66F 9/075* (2006.01)
  *B66F 9/08* (2006.01)
  *B66F 13/00* (2006.01)
  *F16G 13/20* (2006.01)
  *B25J 18/04* (2006.01)
  *F16H 19/06* (2006.01)

(52) U.S. Cl.
  CPC ............ *B66F 9/063* (2013.01); *B66F 9/0755* (2013.01); *B66F 9/08* (2013.01); *B66F 13/005* (2013.01); *F16G 13/20* (2013.01); *B25J 18/04* (2013.01); *F16H 19/0636* (2013.01)

(58) Field of Classification Search
  USPC ................... 254/122; 187/269, 211; 182/141
  See application file for complete search history.

(56) References Cited

U.S. PATENT DOCUMENTS

| | | | |
|---|---|---|---|
| 2016/0375591 A1* | 12/2016 | Yoon | B25J 18/025 |
| | | | 74/490.05 |
| 2018/0093383 A1* | 4/2018 | Yoon | B25J 19/0062 |
| 2018/0149304 A1* | 5/2018 | Allen | F16G 13/20 |
| 2023/0381953 A1* | 11/2023 | Tanaami | B25J 5/005 |

FOREIGN PATENT DOCUMENTS

| | | |
|---|---|---|
| EP | 3238892 A1 | 11/2017 |
| JP | 2015-213974 A | 12/2015 |
| WO | WO-2006130189 A2 | 12/2006 |
| WO | WO2016181801 * | 11/2016 |
| WO | WO2016181801 A1 * | 11/2016 |
| WO | WO-2016181801 A1 | 11/2016 |

* cited by examiner

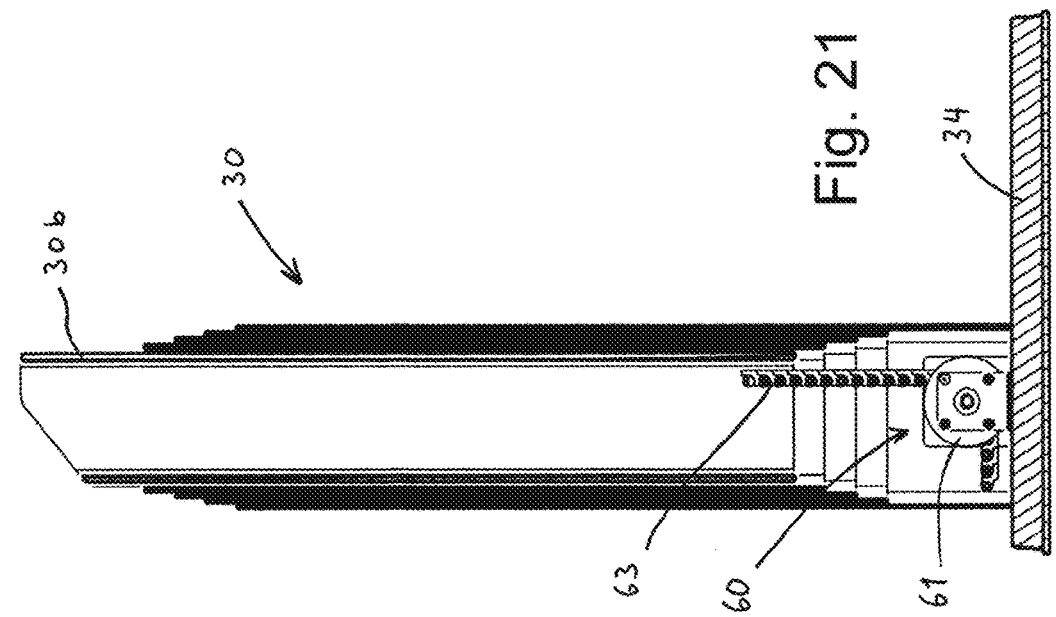
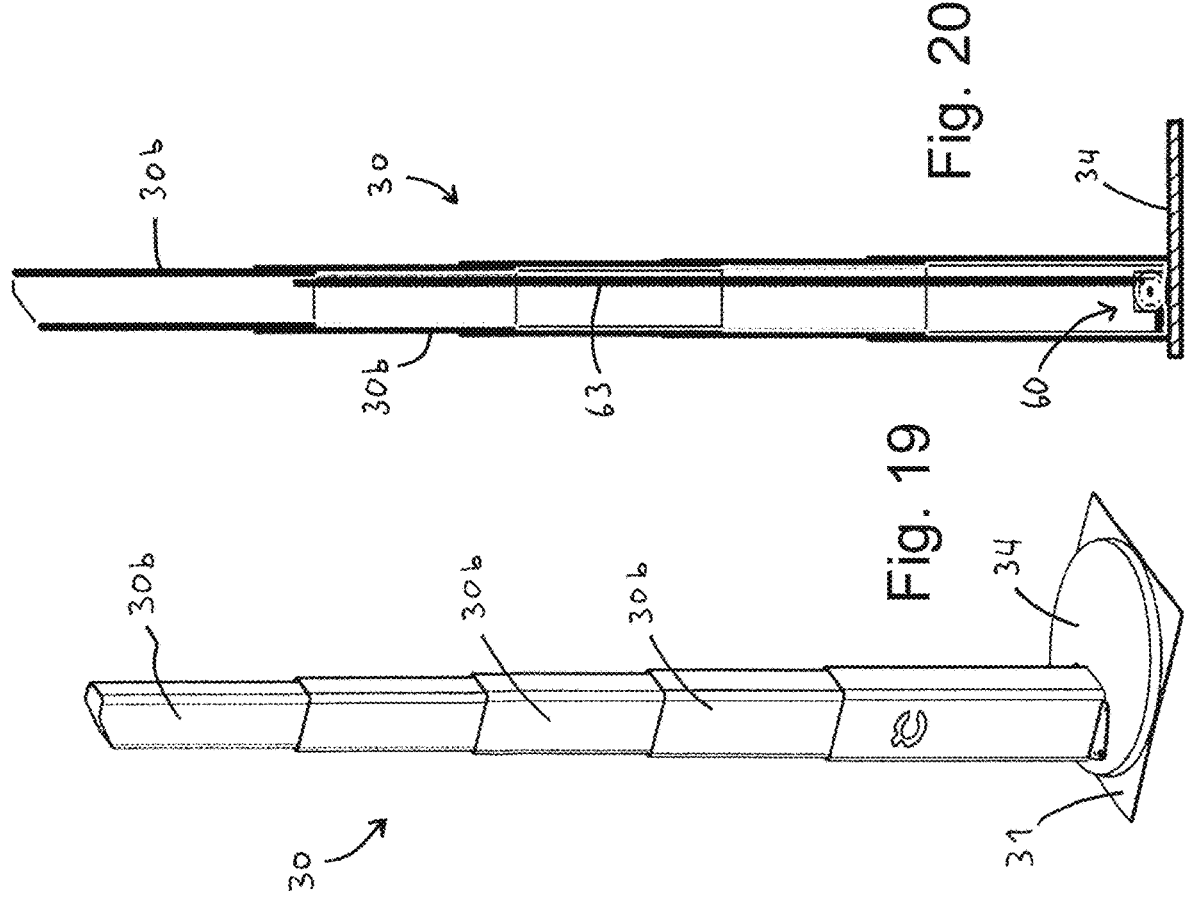

ROBOT PICKING ASSEMBLY

TECHNICAL FIELD

The present invention relates to a robotic picking assembly. In particular, the invention relates to a robot configured to operate in a warehouse where goods typically are stored on pallets placed in rows of pallet racks.

BACKGROUND ART

A Fast Moving Consumer Goods (FMCG) supply chain usually consists of warehouses and distribution centers where goods from different suppliers are stocked, picked and cross docked prior delivery to retail stores. In a warehouse, goods are typically picked from manufacturer pallets and stacked on distributor pallets. One distributor pallet may consist of a wide range of different items.

In such warehouses, the pallets are typically stored in parallel rows of pallet racks. To maximize the effectiveness of the warehouse, it is desirable to place the rows as close as possible, thus leaving little space available between adjacent rows of pallet racks.

Due to their geometry, common 6-axis articulated industrial robotic arms require a large available area around their workspace to be able to operate. Such articulated arms require several actuators, typically one actuator for each joint. Increasing the size of one actuator requires to increase the size and mechanics of all actuators before that given actuator. Thus, such articulated arms are expensive and heavy due to the size and number of actuators.

The significant weight and hence power used for such articulated common robotic arms further make them unsafe for personnel being in their proximity. A lighter robotic arm that needs less power to move, will represent a reduced risk to a human.

Another disadvantage with such articulated robotic arms, is that power is normally needed in all actuators for working at a given position and orientation.

There is thus a need for a robotic picking assembly, which exhibits an arm with a long reach, can extend into a slim space from a limited operation space, can carry a significant payload, and which has a low power consumption.

SUMMARY OF INVENTION

According to the present invention, there is provided a robotic picking assembly comprising an arm support arrangement configured to move vertically and to rotate about a vertical axis, a horizontally extendable arm supported in the arm support arrangement, and a gripping tool arranged at a free end of the arm. The arm comprises a plurality of arm modules linked together in a chain. The arm modules comprise a pivot means linking adjacent arm modules together in a pivoting manner and a pivot restriction means limiting curving of the arm to only one direction. The arm support arrangement comprises an arm guiding arrangement configured to guide the arm between an extended position and a retracted position. An arm drive arrangement configured to move the arm between said extended and retracted positions.

The arm support arrangement can advantageously be vertically movable on a support structure, such as a tower. The support structure can advantageously be rotatable about a vertical axis, thus making the arm support arrangement rotatable.

The pivot restriction means is configured to hinder curving beyond a straight line in the one direction, while allowing curving in the opposite direction. Hence, when the pivot restriction means is acting, two adjacent/succeeding arm modules are arranged in parallel along a common center line.

When stating that the arm support arrangement comprises an arm drive arrangement, it shall be understood that the arm drive arrangement is supported in the arm support arrangement and transfers a driving force onto the arm when the arm is moved towards its extended or retracted position.

The robotic picking assembly will be well suited for automated operation in a restricted space. Its arm will be suited for being inserted into narrow spaces for picking items, such as items stacked on pallets.

Advantageously, in preferable embodiments, none of the actuators or motors that are used for movement of the arm, are arranged as a part of the arm.

When the arm is in the retracted position, a portion of the arm can exhibit an upwardly curved shape between the free end and a back end.

Moreover, when in the retracted position, the arm can curve at least 180 degrees, preferably at least 270 degrees.

In the retracted position, the arm will advantageously curve less than 360 degrees, preferably even less than 280 degrees.

In some embodiments of the present invention, the arm modules can comprise a pitch rack and that the arm drive arrangement can comprise a motorized cogwheel engaging the pitch racks. Preferably, the pitch racks are arranged on side of the arm that exhibits a convex shape when the arm is curved.

The arm modules can comprise an umbilical channel and an umbilical can extend through the umbilical channel to the free end of the arm. In such embodiments, one will be able to guide power and/or sensor signals to and from the free end of the arm. Such power and signals can for instance relate to the operation of the gripping tool, a camera, or force gauges.

Advantageously, a back end of the arm can be fixed to an end unit of the arm support structure. The back end of the arm may be fixed in a vertical orientation. Alternatively, the back end of the arm may be fixed in a pivoting manner, such as with a hinged connection to the arm support structure.

When the back end of the arm is fixed in a vertical position, the arm will curve 270 degrees between this vertical position and the horizontal orientation of the arm portion at the free end of the arm.

Notably, in some embodiments of the invention, the back end would not need to be fixed to the arm support arrangement. Rather, the back end could run freely along a predetermined guided path, along with the movement of the arm out of and back into the arm support arrangement. However, such embodiments could make electric, fluid, or optical connection to the free end of the arm more difficult.

The arm modules may comprise a stabilizing protrusion at one end and a stabilizing groove at the opposite end, wherein the stabilizing groove can be configured to receive the stabilizing protrusion of an adjacent arm module.

The pivot restriction means can comprise a rear abutment surface and a front abutment surface, which are configured to abut against each other when adjacent arm modules are in a straight configuration.

The arm guiding arrangement can comprise a lower vertical guide wheel supporting the arm from below and an upper vertical guide wheel supporting the arm from above. The lower vertical guide wheel can be arranged closer to the free end than what the upper vertical guide wheel is when the arm is in the extended position. The lower vertical guide wheel can take at least some of the weight of the extended portion of the arm, along with the weight of a possible payload.

Advantageously, the arm modules can be provided with module rollers configured to engage a guiding means of the arm support arrangement. The module rollers can be arranged on a pivot axis, about which adjacent modules can pivot with respect to each other.

Furthermore, the arm support arrangement can advantageously have a roller groove and the arm modules can comprise pairs of module rollers. In such embodiments, a horizontal portion of the roller groove can engage module rollers, so that the weight of an extended portion of the arm, as well as the weight of a carried item held by the gripping tool, is carried by the engagement between the horizontal portion and the module rollers. Thus, in such embodiments, the arm support module can be without a lower vertical guide wheel.

The arm guiding arrangement can comprise a roller groove having a horizontal portion, and a curved portion that curves upwards with respect to the horizontal portion.

The length of the horizontal portion can in some embodiments be less than 2.5 module lengths, preferably less than 3.5 module lengths.

The arm modules can comprise a box-shaped module body with two opposite and parallel side walls, and a substantially flat lower surface.

In some embodiments, the arm drive arrangement has not more than one electric arm drive motor configured for moving the arm between the extended and retracted positions.

In some embodiments, when in the extended position, at least 50%, more preferably at least 70%, of the total number of arm modules of the arm can be arranged along a common straight centerline.

Advantageously, the arm can be without actuators or motors configured to move the arm, as such actuators or motors can be arranged external of the arm. It will be understood that in such embodiments, the arm may comprise other actuators, such as a gripping tool provided with an actuator or motor.

The robotic picking assembly according to the invention may in some embodiments further comprise a vehicle structure with at least three wheels, typically four wheels, which is configured to move the robotic picking assembly on a horizontal surface, typically the floor of a warehouse. It may further comprise a vertical movement arrangement configured to move the arm support arrangement vertically, a rotation arrangement configured to rotate the arm support arrangement about a vertical axis, and a pallet support arrangement configured to support a pallet.

In such embodiments, these parts can be integrated into one single product/assembly.

The arm modules may comprise a curve restriction means configured to restrict curving of two adjacent arm modules beyond 90 degrees, preferably 75 degrees.

According to an aspect of the present invention, there is also provided a computer-readable software configured to control a robotic picking assembly according to the first aspect of the invention, when run on a computer, as the software is configured to control the drive arrangement, a rotation motor configured to rotate the arm support arrangement about a vertical axis, a vertical motor configured to move the arm support arrangement vertically, and a vehicle structure configured to move the robotic picking assembly on a horizontal surface.

As the skilled person will appreciate, the term computer shall be broadly construed, as it may be a variety of electric control means, such as a regular computer, a PLC, or a similar control device.

With the present invention, there is provided an assembly having a robotic arm which is relatively thin and light, when compared to prior, comparable solutions. Since the arm can have a nearly perfectly straight extension and can move back and forth along its own longitudinal axis, it is able to operate in tight spaces. Such tight spaces can typically be in a pallet rack that is filled with goods stored on pallets.

Another advantage with the present invention, is that the arm can be made light, compared to other types of robotic arms. One reason for this is that the arm does not require actuators or motors arranged on or in the arm itself for movement of the arm. Rather, all actuators that are used for the movement of the arm can advantageously be configured such that they are not part of the arm itself.

A further advantage with the assembly according to the present invention, is that it requires less energy than comparable assemblies. In an extended position, i.e. when the module arm is extended out into its horizontal, straight configuration, no power is needed to retain the arm in that position. This is in contrast to many other solutions, which require constant power to maintain the current position.

As the skilled person also will appreciate, the length of the arm is easily adjustable, simply by choosing the desired number of arm modules.

BRIEF DESCRIPTION OF DRAWINGS

While various features of the present invention have been discussed in general terms above, a more detailed, non-limiting example of embodiment will be given below with reference to the drawings, in which

FIG. 19 is a perspective view of an alternative embodiment of a tower that may be part of the assembly according to the invention, shown in a vertically extended state;

FIG. 20 is a cross section side view of the tower shown in FIG. 19; and

FIG. 21 is another cross section side view of the tower shown in FIG. 19, however in a vertically retracted state.

DETAILED DESCRIPTION OF THE INVENTION

Figure 1:
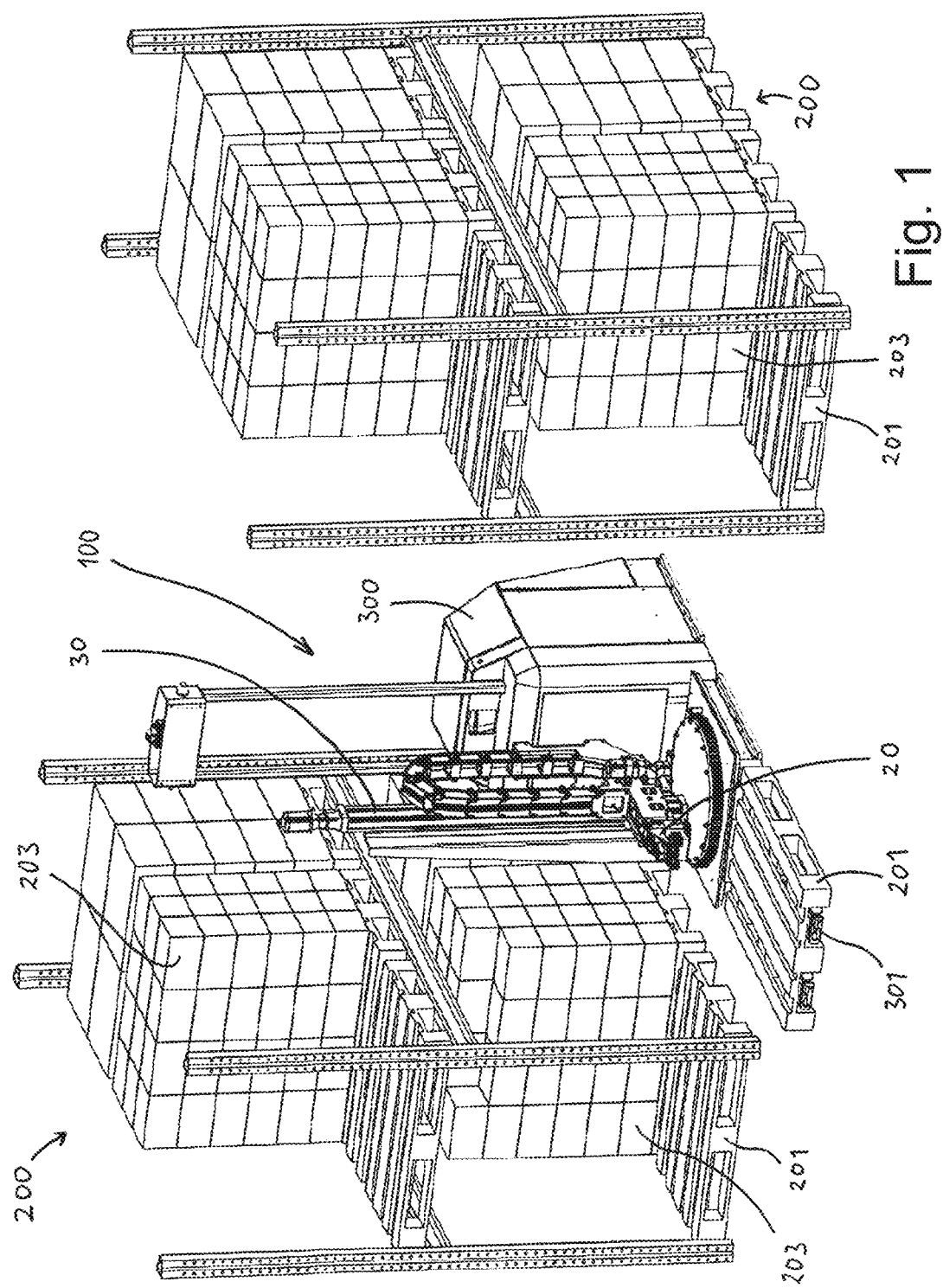
FIG. 1 is a perspective view of a robotic picking assembly according to the present invention, located in the space between two rows of pallet racks.

FIG. 1 depicts a typical application of a robotic picking assembly 100 according to the present invention. The picking assembly 100 is located in a relatively tight space between two rows of pallet racks 200. A plurality of pallets 201 are stored in the pallet racks 200. In the present example the racks are configured for storage of pallets 201 in two vertical levels. On the pallets 201 are various items 203, typically packed in sets of several products. For instance, one item 203 may be a box containing twelve bottles of shampoo, some packs of sugar, or one item 203 may be a box of spare parts, e.g. for household appliances. Typically, each pallet 201 will carry homogenous items 203, i.e. only one type of goods. Thus, there may for instance be one pallet 201 that only carries boxes of shampoo, and three pallets 201 may carry only one type of flour.

To move the robot assembly 100, one can for instance use an automated guided vehicle (AGV) such as the vehicle 300 shown in FIG. 1. The robot assembly 100 has a pallet interface, making it suitable for being moved with a pallet fork, such as a pallet fork 301 of the vehicle 300. In FIG. 1, a pallet 201 is placed on the pallet fork 301. The pallet fork 301 can be seen better in FIG. 2 and FIG. 3.

Figure 2:
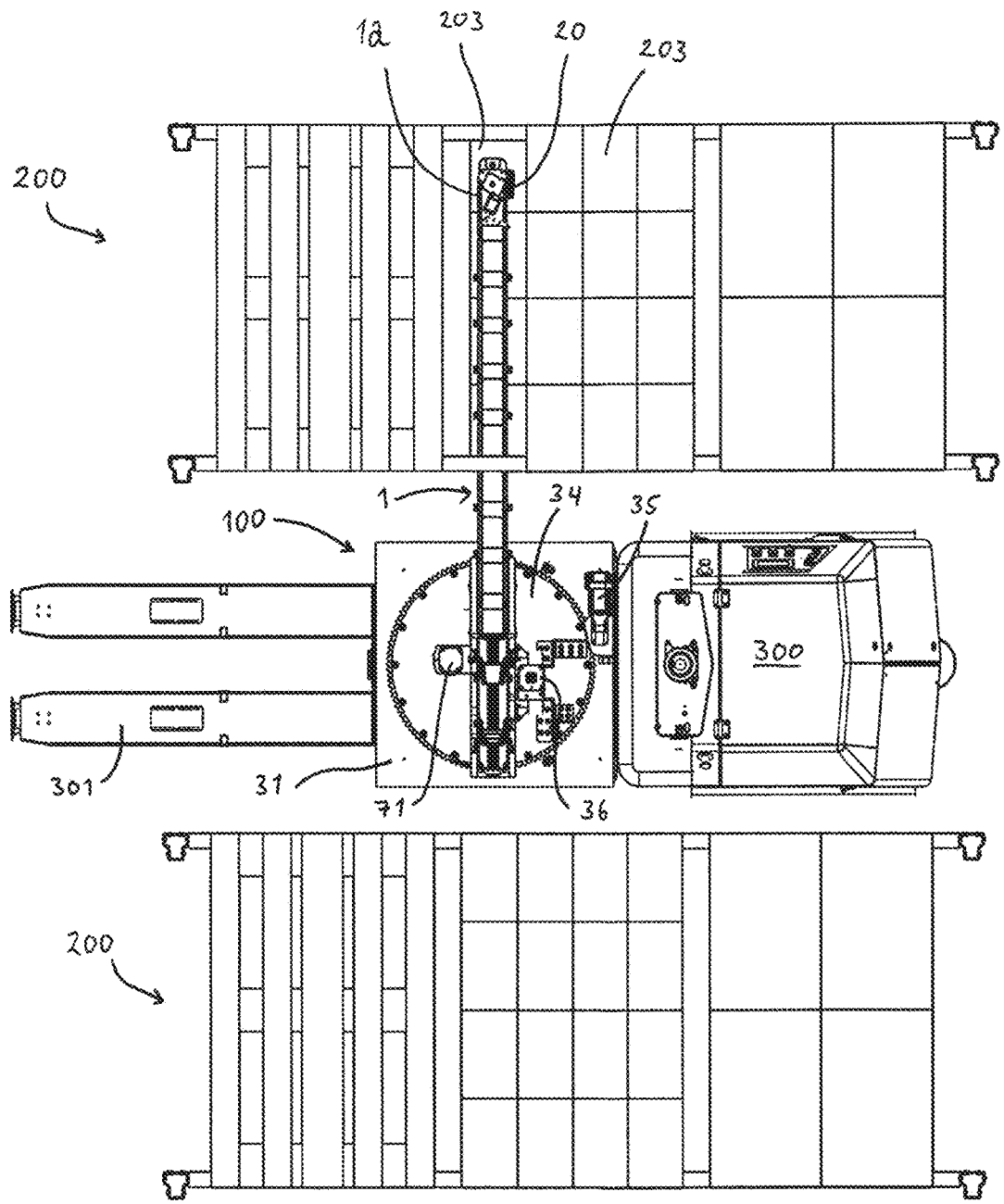
FIG. 2 is a schematic top view showing the position of the picking assembly in FIG. 1 arranged between the two rows.
Figure 3:
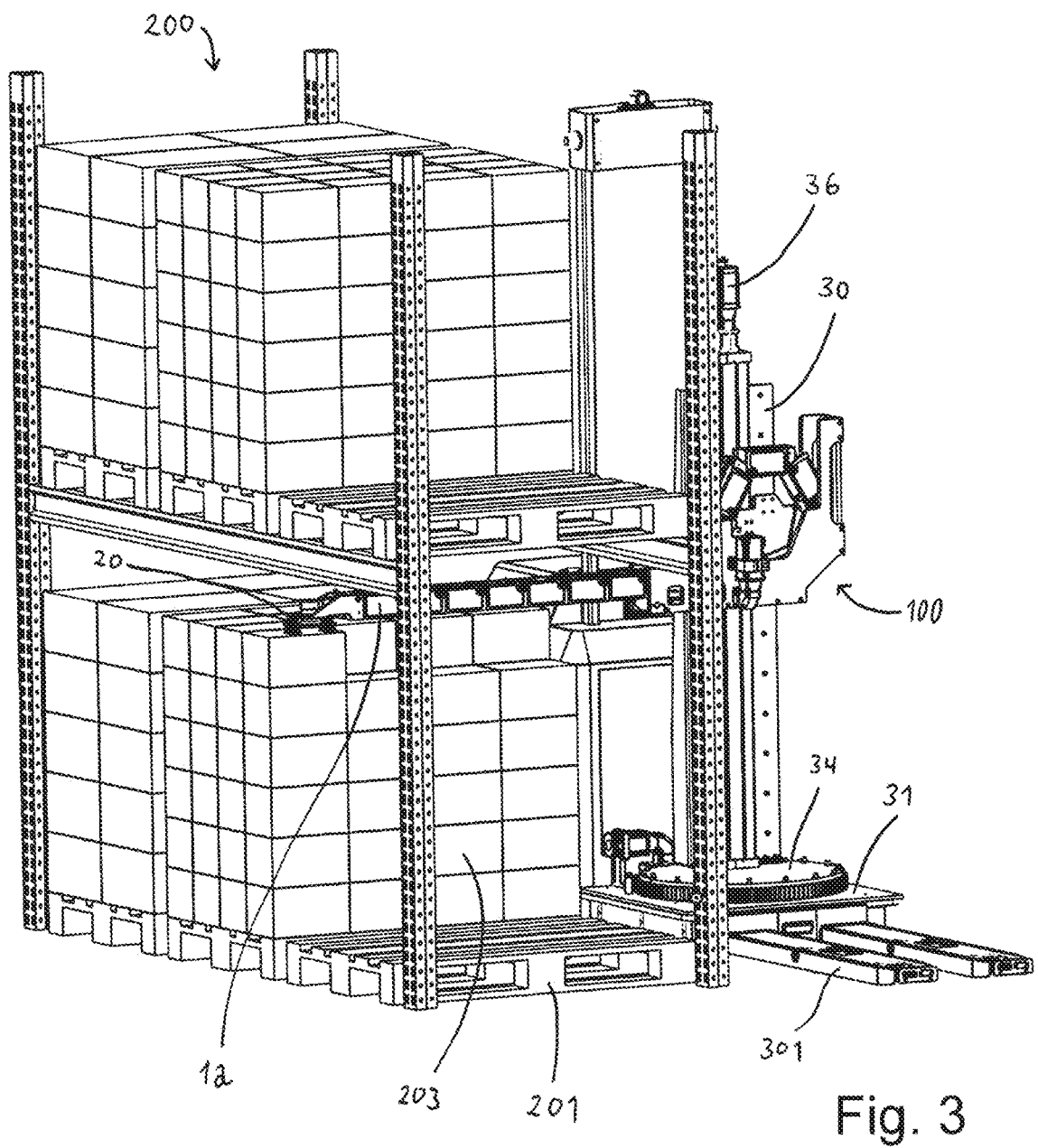
FIG. 3 is another perspective view illustrating the situation in FIG. 1.

FIG. 2 depicts a similar situation as shown in FIG. 1, seen from above. FIG. 3 depicts the robotic picking assembly 100 with another perspective view.

The picking assembly 100 has an arm 1, which can be extended and retracted along a substantially horizontal direction. As shown in FIG. 2 and FIG. 3, the arm 1 can extend a substantial distance into the pallet rack 200. At a free end 1a of the arm 1 there is mounted a gripping tool 20, which is configured to engage the item 203. When the gripping tool 20 has engaged and holds the item 203, the arm 1 is elevated and retracted to collect the item 203. The collected item is then placed on the pallet 201 carried on the pallet interface (pallet fork 301), and the picking assembly 100 can then pick another item 203 to be placed on the carried pallet.

In the depicted, typical application of the assembly 100, it can move about between several rows of pallet racks 200, pick various items 203, and place such items on the pallet 201 which it carries with it.

Figure 4:
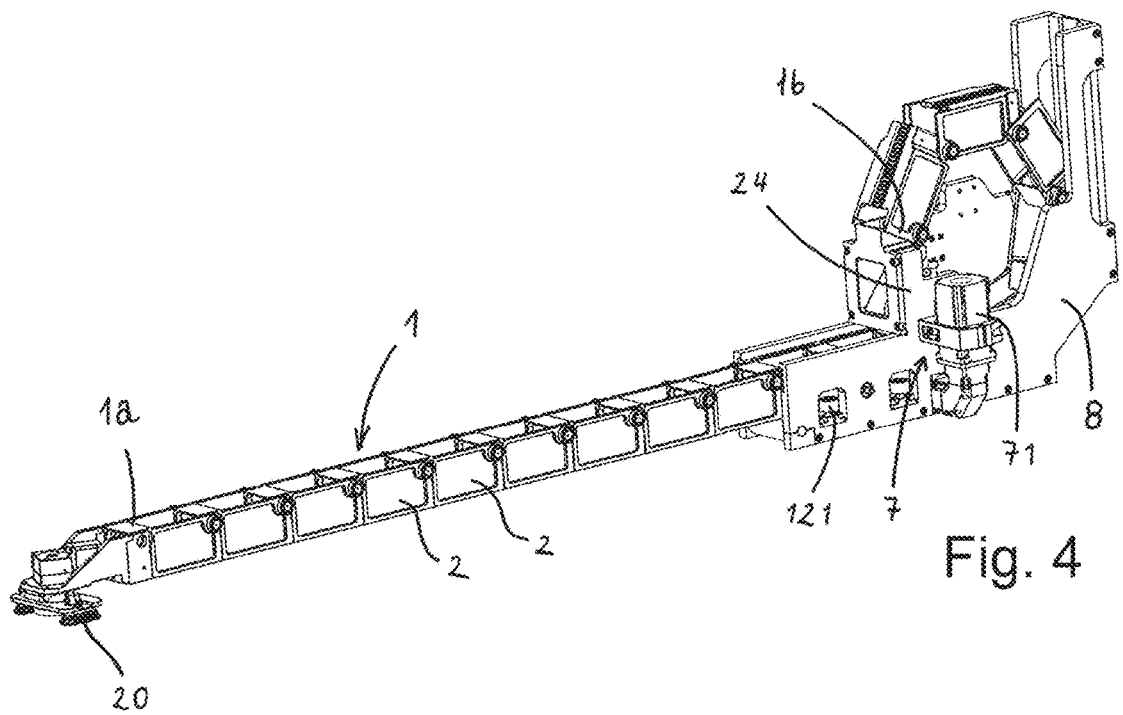
FIG. 4 is a perspective view illustrating the picking assembly where the arm is in an extended position.
Figure 5:
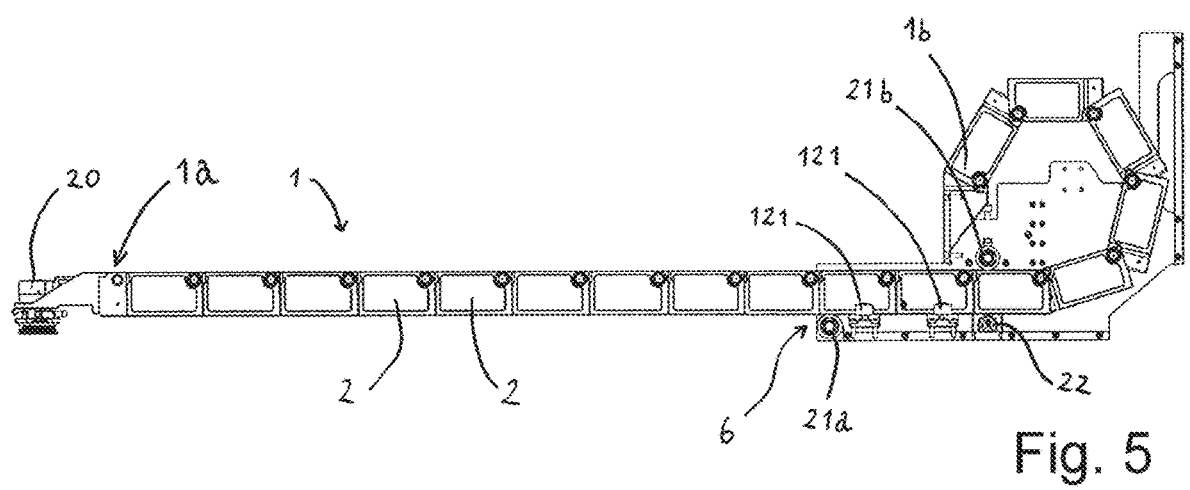
FIG. 5 is a side view of the situation shown in FIG. 4.
Figure 6:
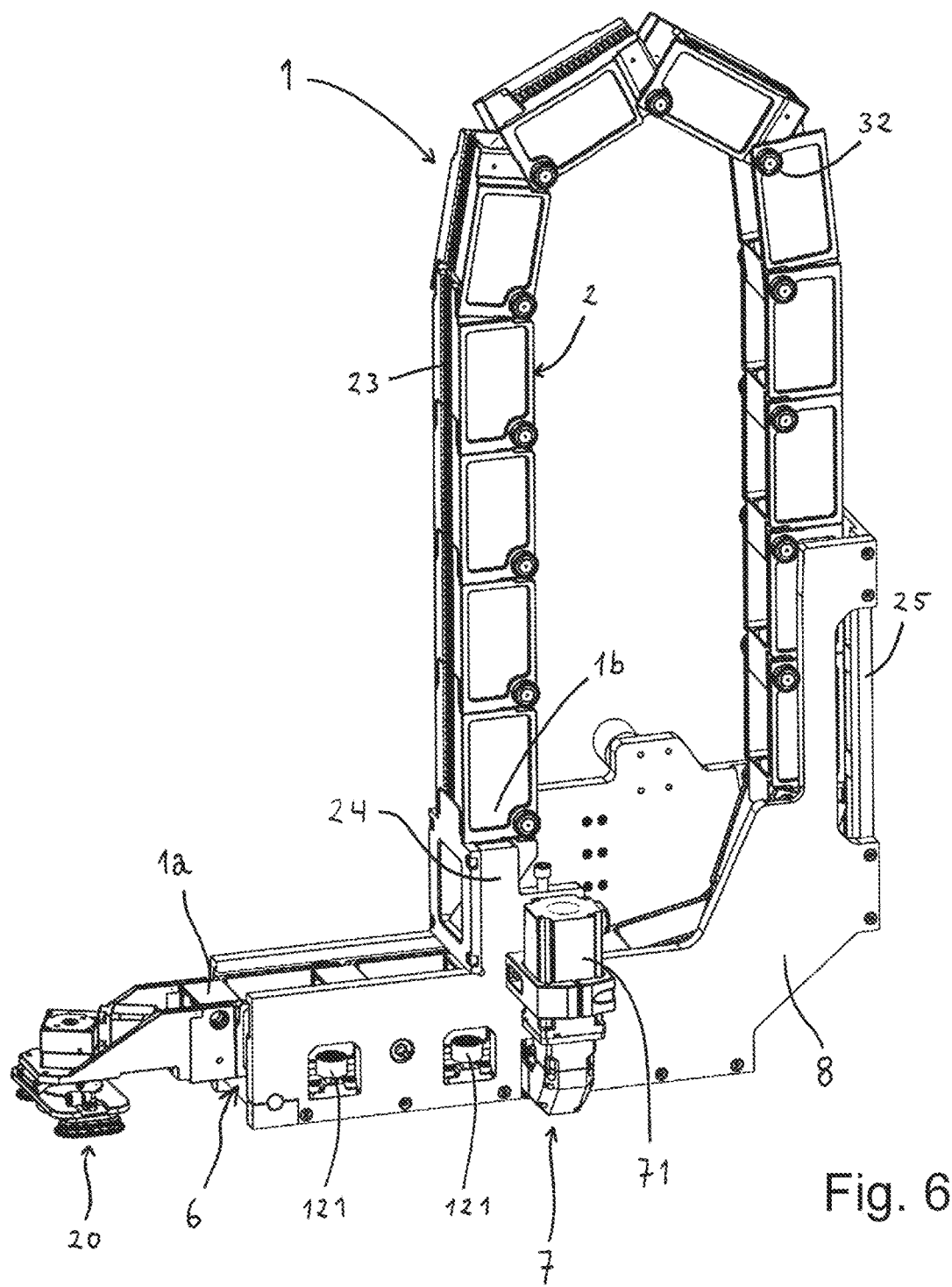
FIG. 6 is a perspective view of the picking assembly where the arm is in a retracted position.

FIG. 4 and FIG. 5 depict a part of the picking assembly 100 in a situation where the arm 1 is extended, such as shown in FIG. 3. FIG. 6 shows the arm 1 in a retracted position.

The arm 1 is supported in an arm support arrangement 8. As can be understood by the drawings in FIG. 4, FIG. 5, and FIG. 6, the arm 1 comprises a plurality of arm modules 2 that are connected to each other with a pivot means, here in the form of a hinge 4. As also appears from these drawings, the arm 1 can bend or curve in one direction only. Thus, in an unfolded, extended state, the unfolded portion of the arm 1 is substantially straight.

The arm support arrangement 8 comprises an arm drive arrangement 7, which will be discussed in further detail below. The arm drive arrangement 7 is a motorized arrangement configured to move the arm 1 out towards the extended position (FIG. 5) and back into the retracted position (FIG. 6).

As will also be discussed in more detail below, the arm support arrangement 8 is configured to store the arm 1 by moving it vertically upwards. A back end 1b of the arm 1 is pivotally fixed to an end unit 24 of the arm support arrangement 8. During extension and retraction out from and into the arm support arrangement 8, the shape of the arm part in the arm support arrangement 8 changes between the nearly O-shaped form shown in FIG. 5 and the upside-down U-shape shown in FIG. 6.

The gripping tool 20 at the free end 1a of the arm 1 can be of any suitable type. For instance, it may be a suction device that is configured to lift items by means of vacuum. In other embodiments, the gripping tool 20 may be of another type, for instance using an electromagnet or a mechanic gripping device. As the skilled person will appreciate, there must be a link to the gripping tool 20, such as a vacuum hose or an electric cable, to operate it. This will be discussed below.

Advantageously, the gripping tool 20 is configured to rotate about a vertical axis. In this manner, it will be able to position collected items 203 on the pallet 201 supported by the pallet fork 301 of the vehicle 300 in a desired orientation. Moreover, by having the gripping tool 20 able to rotate, it can be rotated to the mutual position between the gripping tool 20 and the item 203, which provides the best interface for lifting and holding the item 203. In some embodiments, the gripping tool is configured to rotate at least 90 degrees to either side from an initial base position.

Indicated on FIG. 5 and FIG. 6 is an arm guide orifice 6, which defines the longitudinal position where the straight portion of the arm 1 leaves the arm support arrangement 8. Advantageously, the free portion of the arm 1, i.e. the straight portion of the arm that extends out of and beyond the arm support arrangement 8, can advantageously be at least as long as the corresponding longitudinal length of the arm support structure 8. More preferably, the free portion of the arm 1 can be more than twice the longitudinal length of the arm support arrangement.

When in a fully extended position, the distance between the position of the gripping tool 20 and the position where the arm 1 enters the arm support arrangement 8, is advantageously at least 1.5 meters, preferably at least 1.6 meters. This means that when arranged adjacent a pallet rack 200, the robotic picking assembly 100 can reach and pick items 203 at about 1.6 meters into the rack. Such a situation is illustrated in FIG. 2 (although in this image, there is some distance between the arm support structure 8 and the face of the pallet rack 200).

Figure 7:
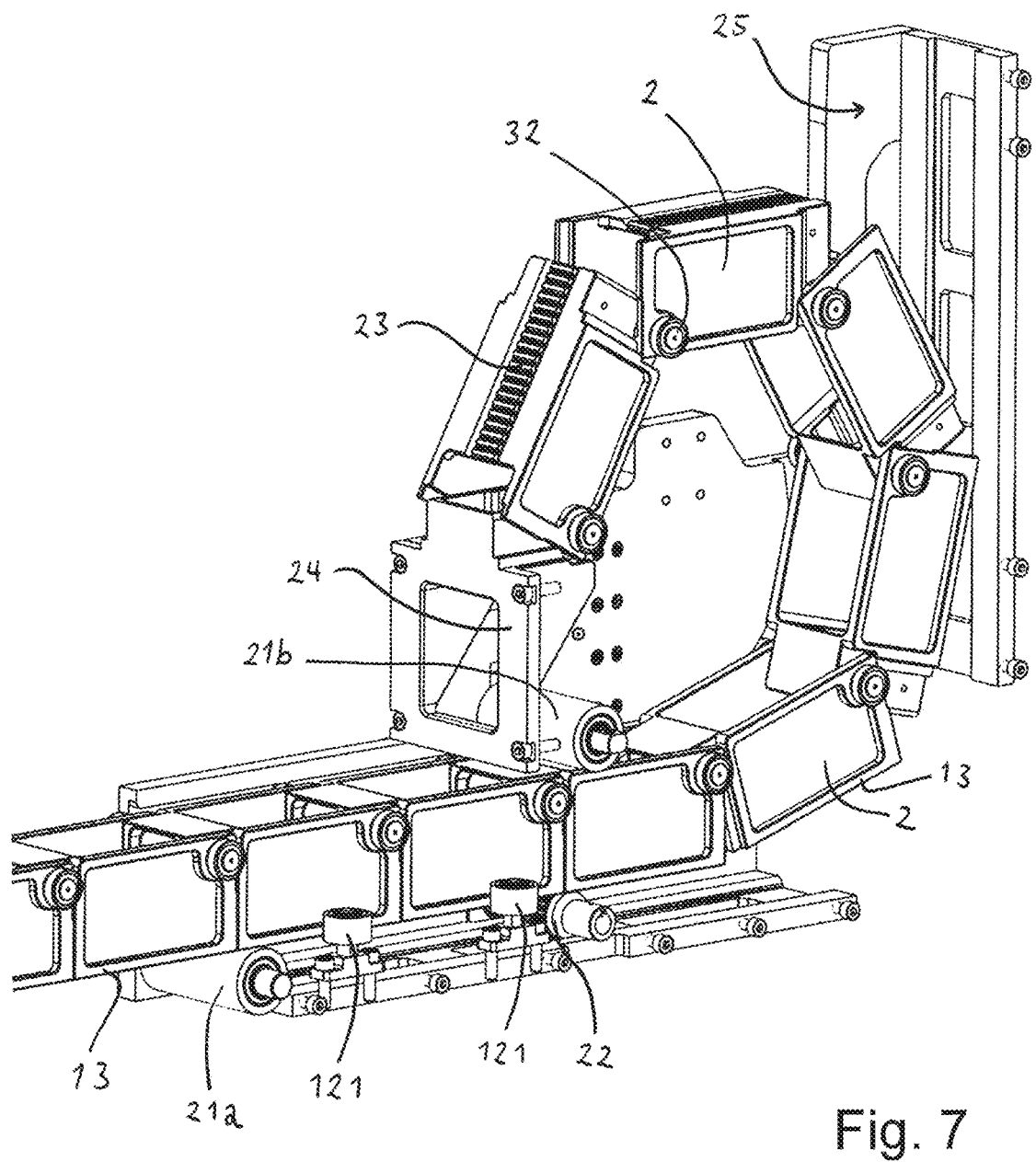
FIG. 7 is an enlarged perspective view of a portion of the arm when in an extended position, wherein some components have been removed for illustrational purpose.

Reference is now made to FIG. 7, as well as to FIG. 6. In FIG. 7, a side panel of the arm support arrangement 8 has been removed for illustrational purpose.

As can be seen in FIG. 7, the arm modules 2 are provided with a pitch rack 23 on their underside. When the arm 1 is in its straight configuration, the pitch rack 23 of the adjacent arm modules 2 together form a continuous pitch rack. The arm drive arrangement 7 comprises an arm drive motor 71 (FIG. 6) that drives a cogwheel 22 (FIG. 7). The cogwheel 22 is in engagement with the pitch racks 23 of the arm modules 2, thereby being able to move the arm 1 between the extended and retracted positions. When rotating the cogwheel 22 so that the arm 1 moves towards the retracted position, a portion of the arm 1 is automatically guided vertically upwards so that it takes the upside-down U-shape shown in FIG. 6. In alternative embodiments though, the portion of the arm stored in the arm support arrangement 8 could also be stored in a rolled-up configuration. That could, however, require more space in the horizontal direction.

Instead of the cogwheel 22 engaging with a pitch rack 23, other means for moving the arm 1 can be used. For instance, a drive system based on friction can be used, such as a rubber wheel replacing the cogwheel and a flat surface replacing the pitch rack 23.

Figure 8:
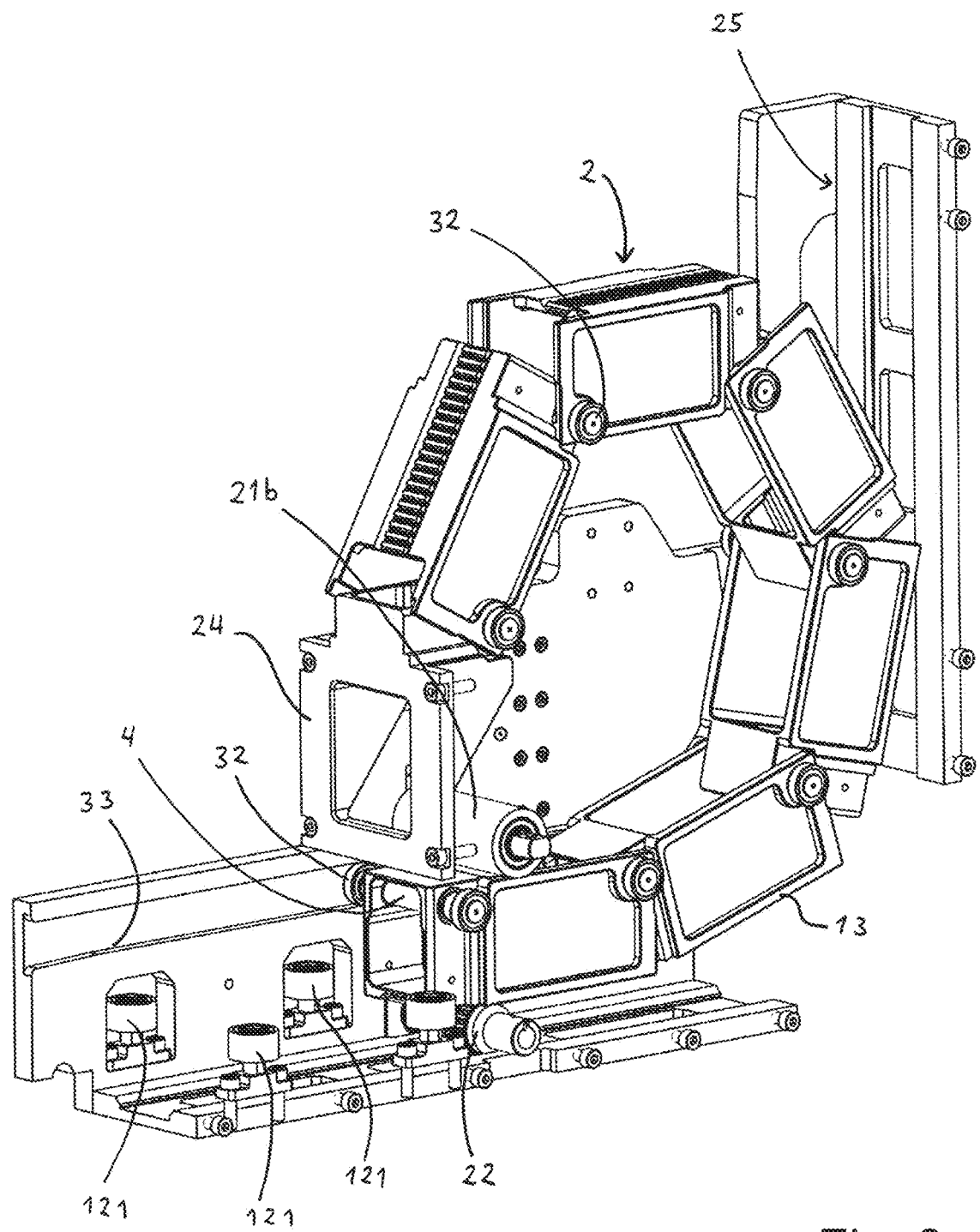
FIG. 8 is a view corresponding to FIG. 7, with a portion of the arm removed for illustrational purpose.

Referring to FIG. 7 and FIG. 8, the arm modules 2 comprise guiding surfaces 13 at opposite lateral sides. In the shown embodiment, the guiding surfaces 13 are arranged at a lower portion of the arm modules 2. The arm support arrangement 8 comprises one or more pairs of lateral guide wheels 121 that engage the guiding surfaces 13. This provides lateral stability of the extended part of the arm 1. The lateral guide wheels 121 are configured to rotate freely about a vertical axis.

In addition to the lateral guide wheels 121, there is arranged a lower vertical guide wheel 21a. The lower vertical guide wheel 21a supports the extended portion of the arm 1 from below. The lower vertical guide wheel 21a rotates about a horizontal axis, perpendicular to the extended portion of the arm 1.

An upper vertical guide wheel 21b is arranged to keep the pitch racks 23 of the arm modules 2 in engagement with the cogwheel 22. Also, the upper vertical guide wheel 21b presents a counterforce against the arm 1 so that the arm is retained in its correct extending position.

When the arm 1 is in an extended position, such as shown in FIG. 5, the vertically directed forces from the lower vertical guide wheel 21a and the upper vertical guide wheel 21b retain the arm in the correct vertical position. The lateral guide wheels 121 retain the arm in the correct lateral position.

Advantageously the upper vertical guide wheel 21b is arranged directly vertically above the cogwheel 22 of the arm drive arrangement 7. This ensures a proper engagement between the cogwheel 22 and the pitch racks 23, even when a heavy item 203 is carried by the gripping tool 20.

As the skilled person now will appreciate, the entire horizontal movement between the extended and retracted positions of the arm 1, can be performed with only one motor (i.e. the arm drive motor 71). Furthermore, even when in an extended position, no power is required to maintain the arm in the correct position, since the arm "rests" in its support in the arm support arrangement 8 (i.e. the lower and upper vertical guide wheels 21a, 21b in the shown embodiment).

The adjacent arm modules 2 are linked to each other by means of a pivot means 4 (FIG. 8), which advantageously can be in the form of hinge bolts. As shown in FIG. 8, module rollers 32 are arranged in line with the pivot means 4. In the shown embodiment, the module rollers 32 are arranged at the end of the hinge bolts. In other embodiments, the module rollers 32 can be arranged elsewhere on the arm modules 2.

As shown in FIG. 8, the module rollers 32 are received in roller grooves 33 arranged in the arm support arrangement 8. The roller groove 33 is a form of guiding means of the arm support arrangement 8, which contributes in aligning the arm modules 2 with each other. The roller grooves 33 also contribute in guiding the module rollers 2 towards the correct position during movement towards the extended or retracted position.

During movement towards the retracted position, additional (not shown) roller grooves arranged in the arm support arrangement 8 can be provided to lift the arm modules 2 towards the curved shape rearwards of the cogwheel 22 and the upper vertical guide wheel 21b. A sliding abutment between the arm modules 2 and an arm track 25 on rear vertical portion of the arm support arrangement 8 may also contribute in guiding the stored portion of the arm towards its storage configuration. The engagement between the module rollers 32 and the roller groove 33 will be further discussed below, with reference to FIG. 17.

The arm track 25, lateral guide wheels 121, lower vertical guide wheel 21a, and the upper vertical guide wheel 21b together form an arm guiding arrangement configured to guide the arm 1 correctly between the extended position and the retracted stored position. The roller groove 33 may also be a part of the arm guiding arrangement. This is discussed in further detail below, with reference to FIG. 17.

While movement of the arm 1 towards the extended and the retracted positions has been discussed above, reference is now made to FIG. 9, for discussion of vertical movement and rotational movement of the arm 1.

Figure 9:
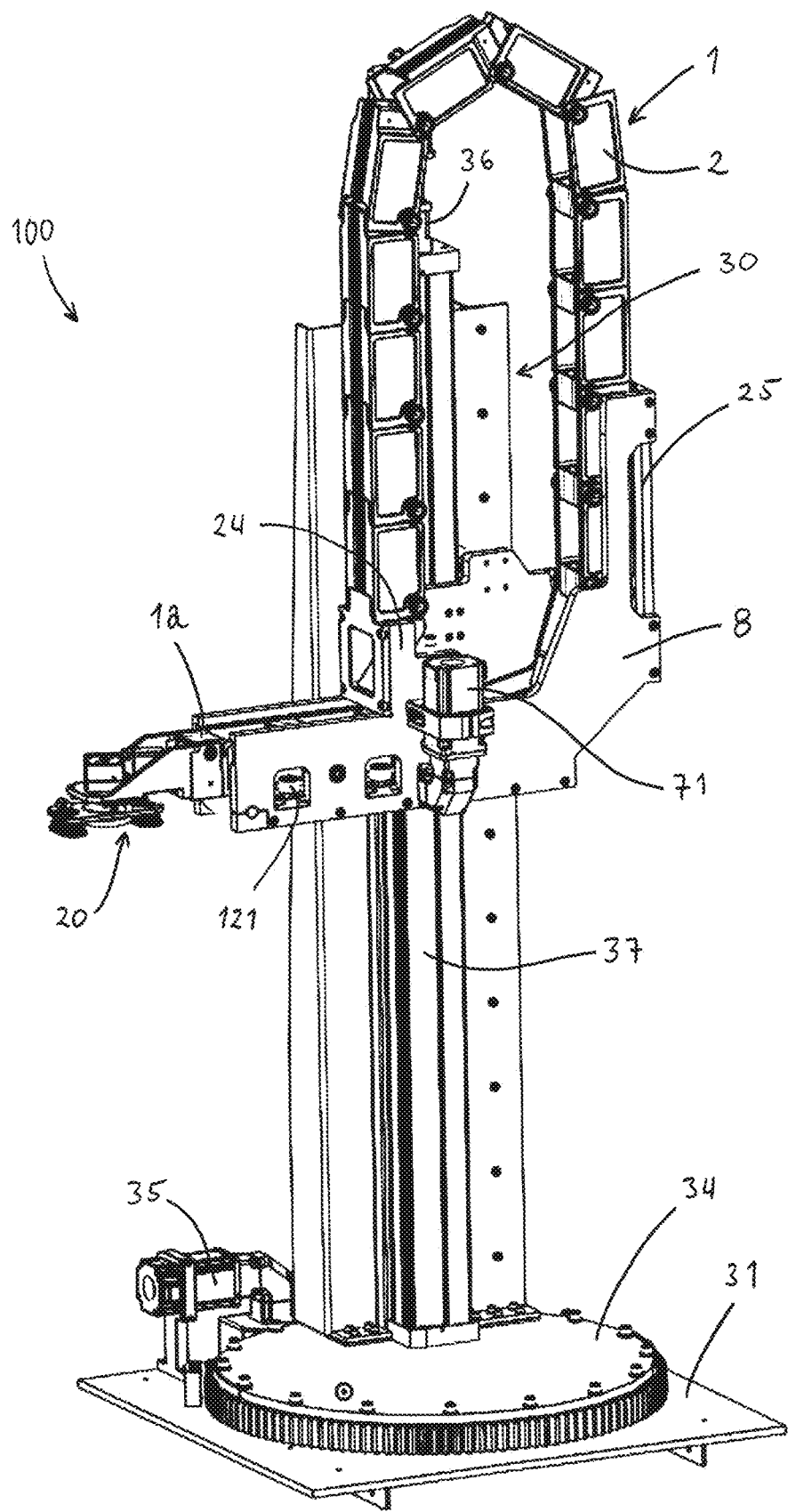
FIG. 9 is a perspective view of the picking assembly, shown with a vertical support structure, such as a tower, and means for rotating the assembly about a vertical axis.

The robotic picking assembly 100 shown in FIG. 9 is arranged on a tower 30. The tower 30 is supported on a rotating base plate 34. The base plate 34 is provided with a circular toothed perimeter and is configured to rotate with respect to a bottom plate 31. A rotation motor 35 is fixed to the bottom plate 31, and provides rotation of the base plate 34, the tower 30, and thus the arm 1 upon activation and engagement with the toothed perimeter of the base plate 34. As the skilled person will appreciate, other means for rotation of the tower 30 may be appropriate. For instance, a belt drive can be arranged and driven by an electric actuator.

At an upper portion of the tower 30, there is arranged a vertical motor 36, which is provided for vertical movement of the arm support arrangement 8 along the vertical extension of the tower 30. The vertical motor 36 is barely visible in FIG. 9 due to the arm 1 but can be seen more clearly in FIG. 3.

The arm support arrangement 8 is configured to move vertically with respect to the tower 30 and is guided on a vertical guide rail 37. The mechanism for moving the arm support arrangement 8 is not discussed in detail herein, as the skilled person may choose among a variety of different solutions to obtain this movement. As an example, the vertical motor 36 may operate a chain connected to the arm support arrangement 8, to provide the vertical movement.

It is now clear to the skilled person that the arm 1 can be moved vertically and it can be rotated. As can be seen in FIG. 3, the robot assembly 1 is provided with a pallet interface structure, making it suitable for being moved by a pallet-moving AGV having a pallet fork 301. In other embodiments, however, the robot assembly 100 according to the invention may be integrated as a part of an automated/autonomous robotic vehicle. In such embodiments, the robot assembly 100 and the vehicle can be optimized as one single assembly.

Figure 10:
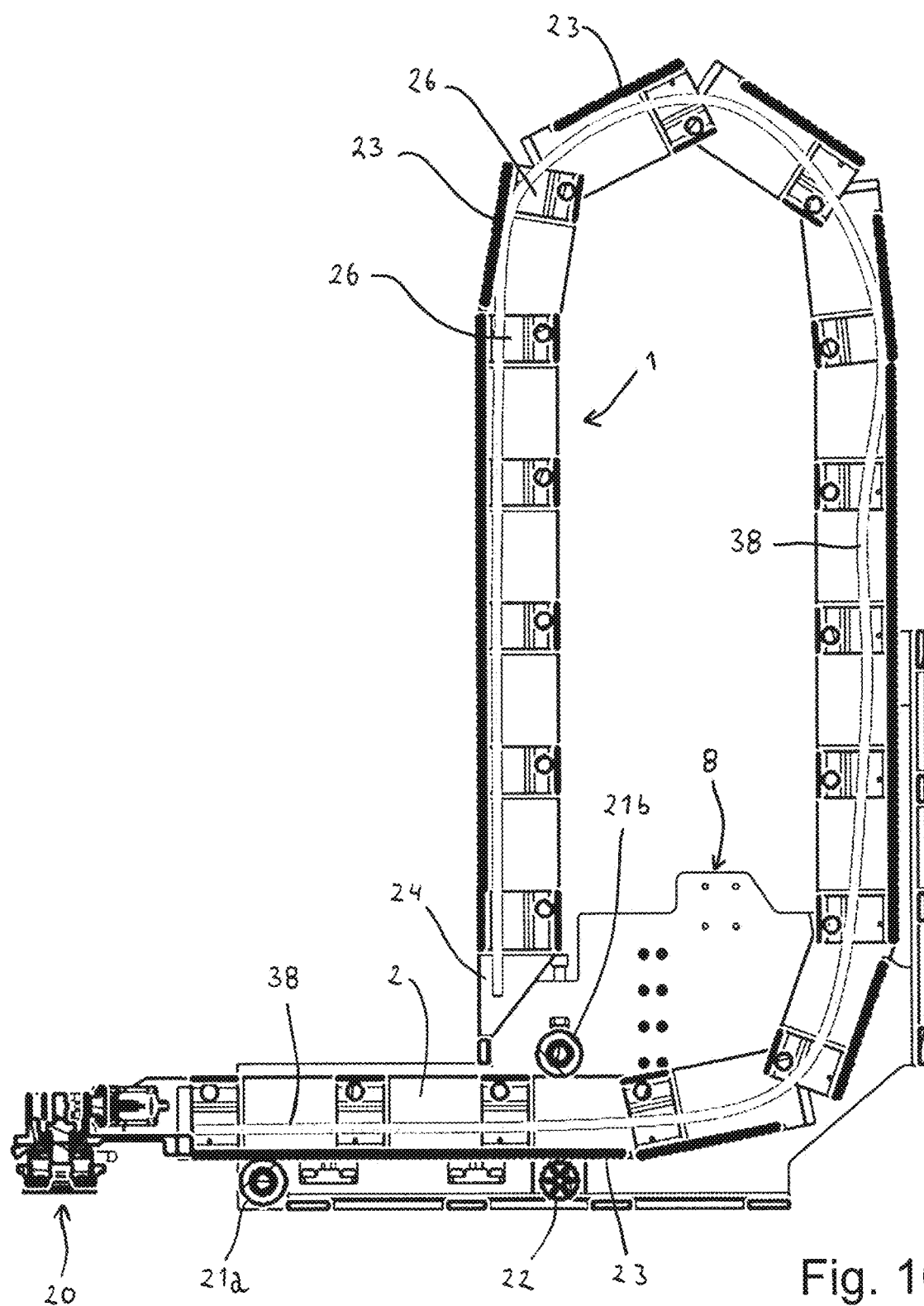
FIG. 10 is a cross section side view of the arm and arm support arrangement, showing an umbilical extending through the arm.

As briefly mentioned above one needs to convey power to the gripping tool 20 to operate it. Moreover, to provide an automated, autonomous assembly, one may provide various types of sensors on the arm 1. Typically, such sensors may be arranged at the position of or in connection with the gripping tool 20. FIG. 10 depicts a cross section side view through the arm 1 and the arm support arrangement 8. An umbilical 38 is extended inside the arm 1, along an umbilical channel 26 provided in the arm. The umbilical may contain a vacuum hose (not shown), electrical cables, optical fibers etc., depending on the specific embodiment. Advantageously, by arranging the umbilical inside the arm 1 itself in this manner, it is less exposed for damage by becoming entangled with external parts.

Figure 11:
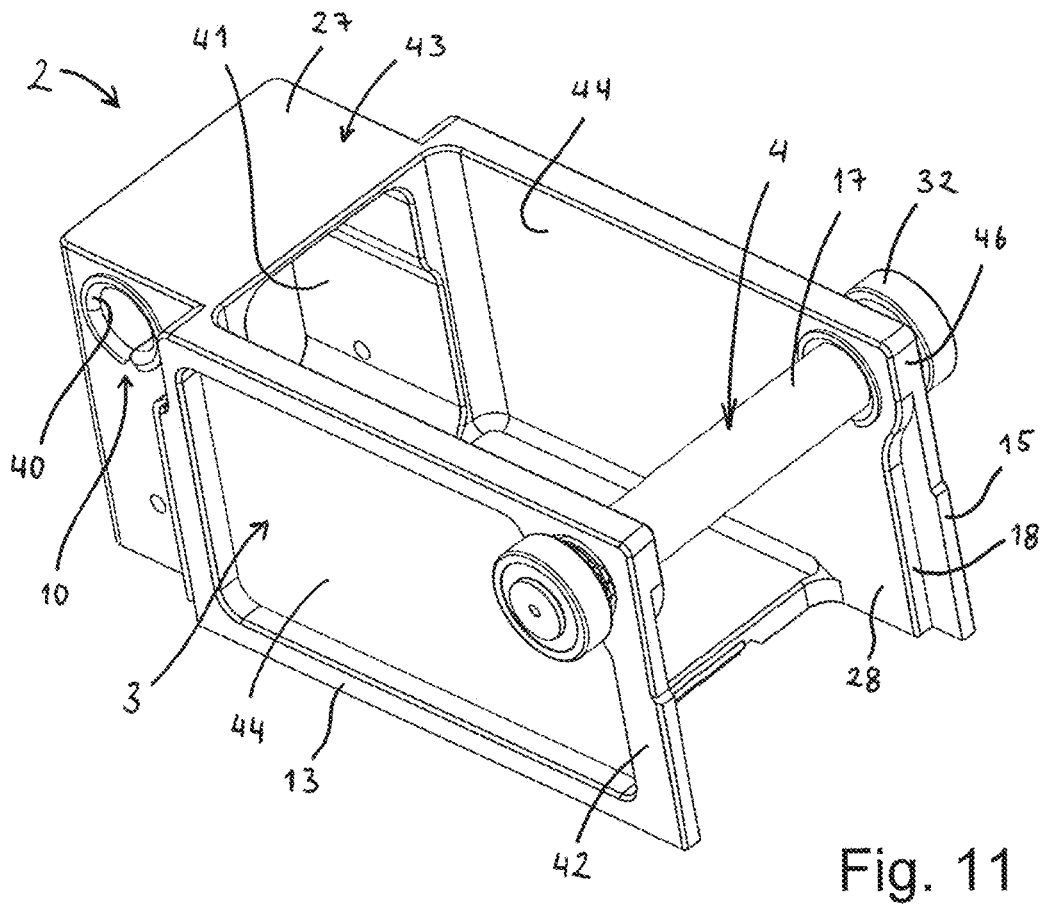
FIG. 11 and FIG. 12 are enlarged perspective views of an arm module.
Figure 12:
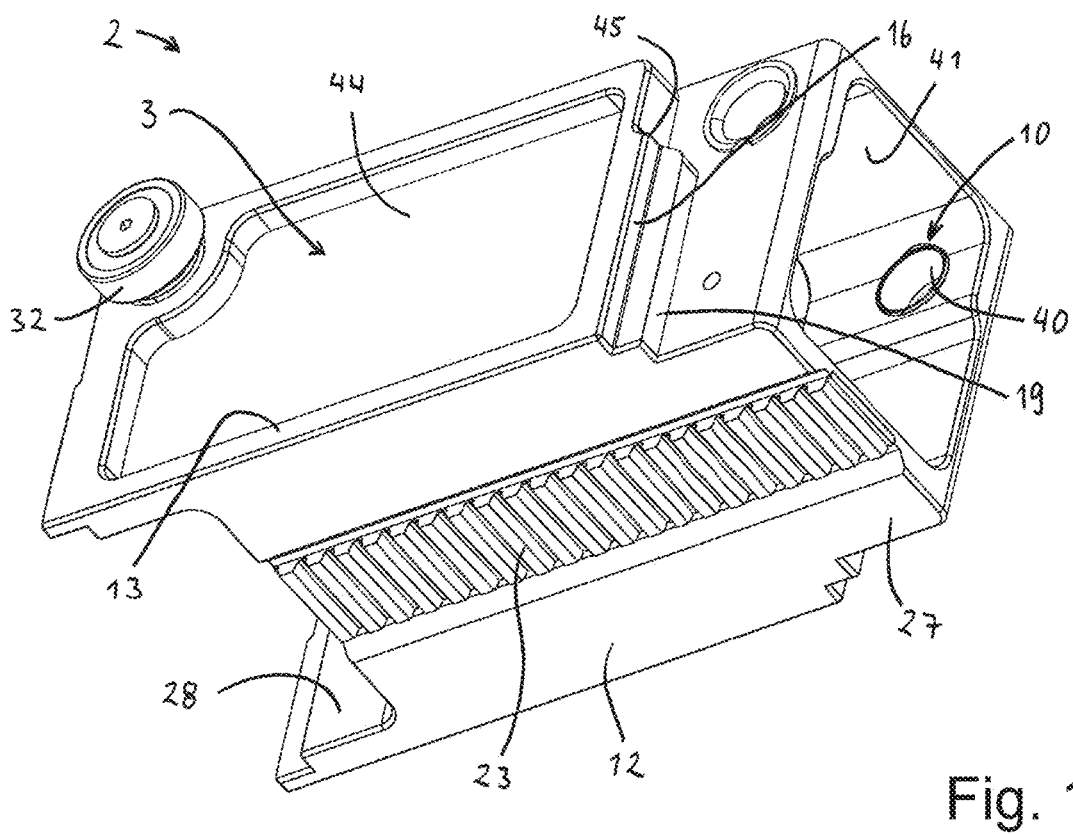

FIG. 11 and FIG. 12 depict one arm module 2 with perspective views. As appears from FIG. 11, the pivot means 4 comprises a hinge bolt 17 that is extended through two side walls 44 of the arm module 2. When in a hinged/connected state, the hinge bolt 17 extends through a pair of hinge apertures 40 arranged at the opposite end of the arm module 2. The hinge apertures 40 is one example of a front hinge structure 10, which for other embodiments may have another design.

The mutual pivoting of two adjacent arm modules 2 takes place about a pivot axis. In the embodiment shown in FIG. 11 and FIG. 12, the pivot axis extends through the center of the hinge bolt 17.

The arm modules 2 have a front portion 43 and a rear portion 42. The modules 2 have a generally box-like shape, with a box-like module body 3 with two side walls 44. The front portion 43 has a reduced size so that at least a part of it can be received between the side walls 44 at the rear portion 42. At a lower portion, the module body 3 has a mainly flat lower surface 12, to which the pitch rack 23 is fixed.

To ensure that the arm 1 can curve only in one direction, a curve in the opposite direction is prevented by means of a pivot restriction means. In the shown embodiment, the pivot restriction means comprises a rear end surface 15 that is configured to abut against a front end surface 16 when in the straight (extended) configuration.

The rear portion 42 of the arm module 2 is provided with a stabilizing groove 28, which is configured to receive a stabilizing protrusion 27 at the opposite front portion 43.

Figure 13:
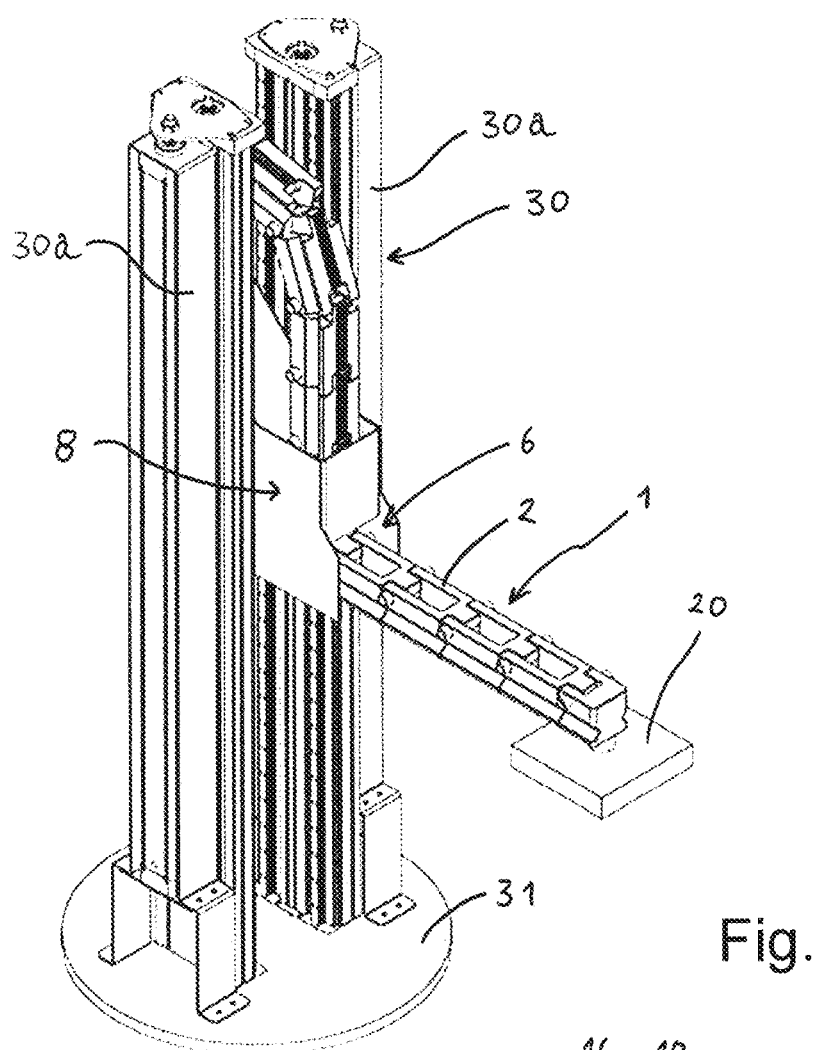
FIG. 13 is another perspective view of another embodiment of the invention.

FIG. 13 depicts an alternative embodiment of the picking assembly 100. In this embodiment, the tower 30 comprises two vertical beams 30a and the arm support arrangement 8 is positioned between these vertical beams. The location where the extended portion of the arm 1 exits out from the arm support arrangement 8, is termed an arm guide orifice 6.

Figure 14:
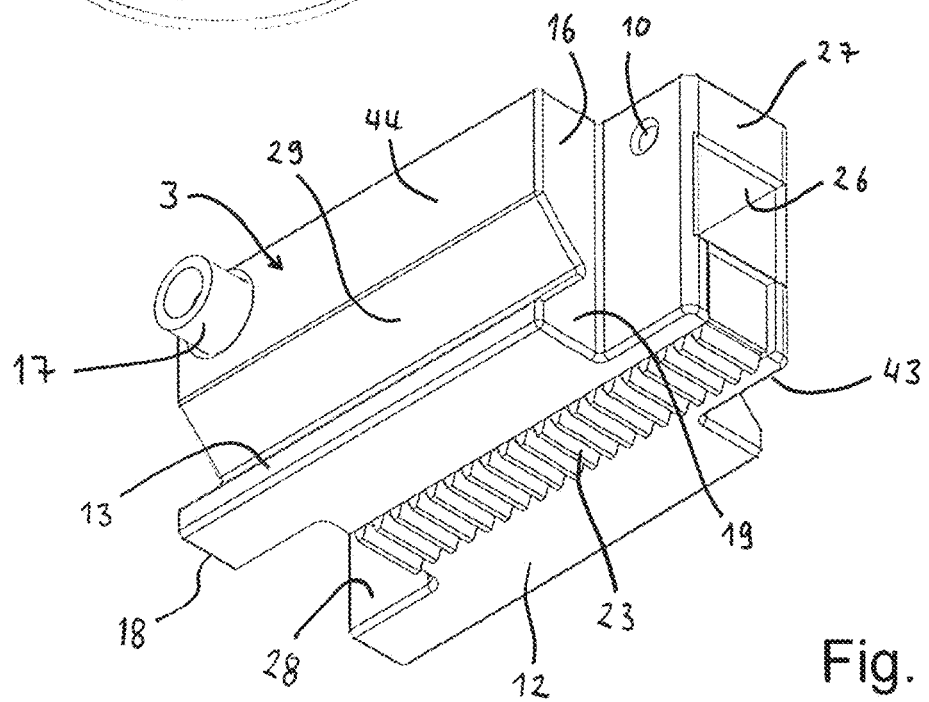
FIG. 14 is an enlarged perspective view of an arm module according to another embodiment of the invention.
Figure 15:
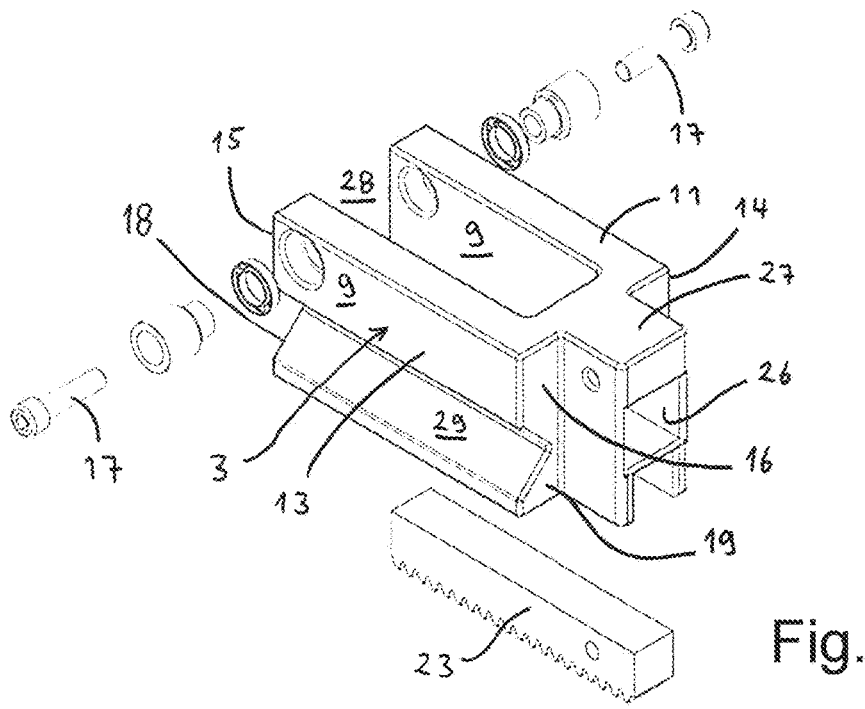
FIG. 15 is an exploded view of the arm module shown in FIG. 14.

FIG. 14 and FIG. 15 depict an alternative embodiment of the arm module 2. In this embodiment, there are arranged side grooves 29 on each opposite side of the side walls 44 of the arm module 2. The side grooves 29 may engage with guiding wheels supported in the arm support arrangement 8. By having side grooves 29 with inclined surfaces, such guiding wheels may simultaneously support the arm 1 laterally and vertically.

The pivot restriction means can comprise a rear abutment surface 18 and a mating front abutment surface 19 positioned below the pivot means at the lower part of respective end surfaces 15, 16 of the module body 3 of two consecutive modules, wherein the abutment surfaces 18, 19 abuts when the centerline of the two consecutive modules are parallel. In an alternative embodiment, the respective end surfaces, as indicated in FIG. 11 and FIG. 12, can be the abutting surfaces that prevents excessive pivoting motion beyond the straight shape of the extended arm 1.

Advantageously, in an embodiment of the second aspect of the invention, the arm drive 7 is a cogwheel 22 fastened to the guide orifice 6 and powered by a motor and a pitch rack 23 fastened to the lower side 12 of the modules 2.

The respective end faces of each module can advantageously comprise a protrusion 27 and a mating groove 29, for improvement of sideway stability of the arm.

An end unit 24 can be arranged in the arm support arrangement 8, which holds the end of the arm 1 in a fixed position, hinged or non-hinged, directing the stored part of the arm vertically away from the guide orifice. Furthermore, the arm track 25 can be arranged, guiding the stored part of the arm towards the guide orifice 6 after the stored part of the arm has described a 180 degree turn.

An umbilical channel 26 parallel to the longitudinal centerline of each module can be provided.

Advantageously, the angular range of movement between any two consecutive arm modules 2 can be at least 30 degrees from an initial straight position.

Figure 16:
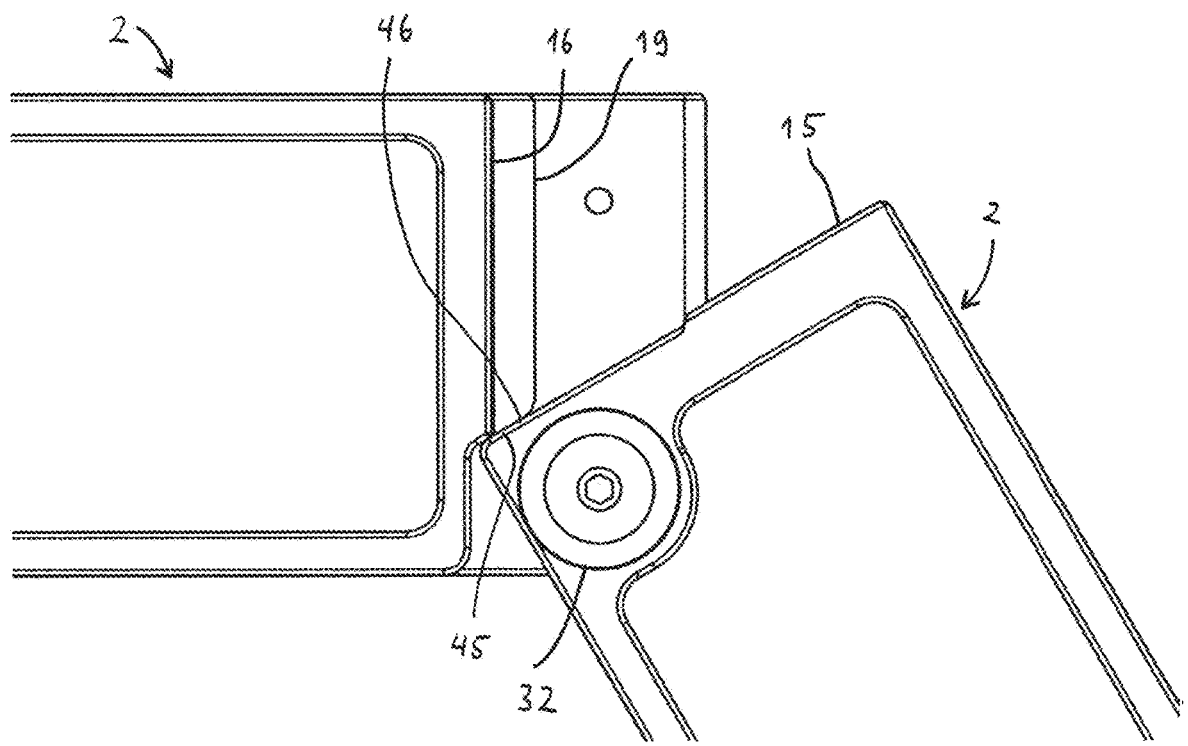
FIG. 16 is an enlarged side view of two adjacent arm modules, shown in a maximum pivot position.

FIG. 16 depicts two adjacent modules 2 of the arm 1, which are curved to their maximum extent. To restrict excessive curving, beyond the position shown in FIG. 16, a curve restriction means is provided. In the shown embodiment, the curve restriction means is in the form of two abutting curve restriction faces 45, 46. As appears from FIG. 16, the two curve restriction faces 45, 46 abut so that a further curving or pivoting movement is prevented.

Figure 17:
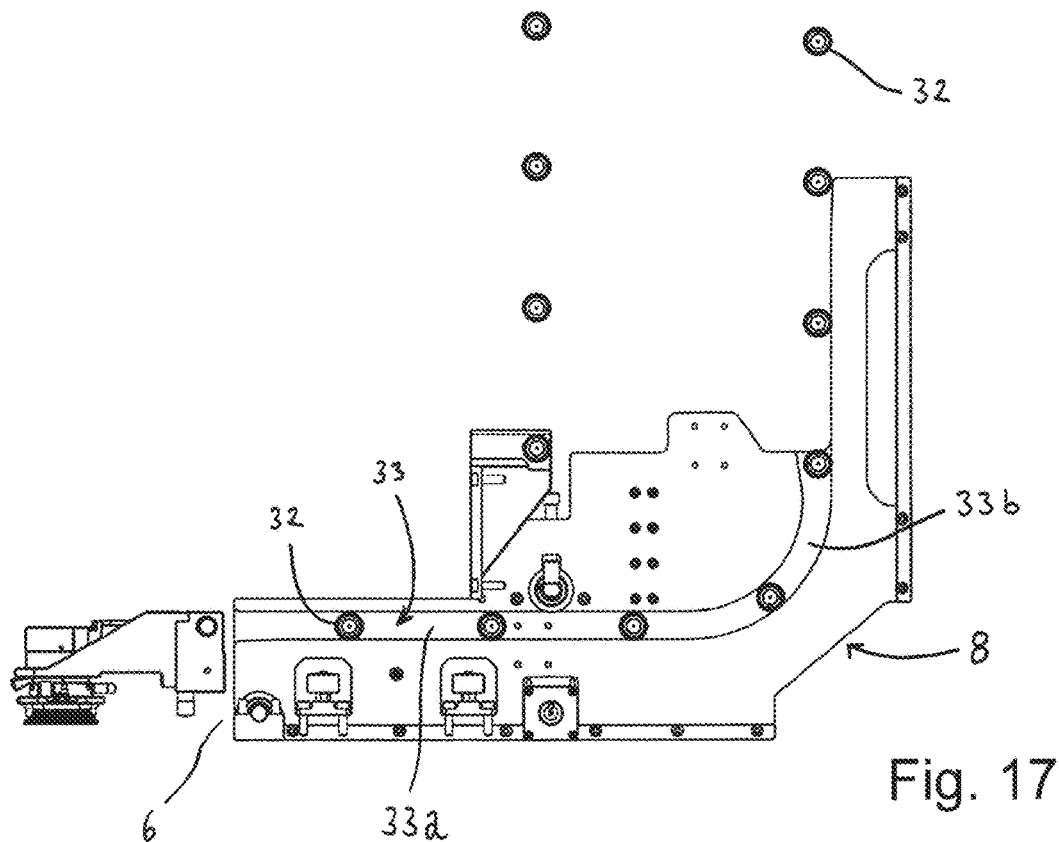
FIG. 17 is a cross section side view through the arm support arrangement.

FIG. 17 depicts a cross section, principle view showing the module rollers 32 in engagement with the roller groove 33. For illustrational purpose, the modules 2 are not shown, but rather only their module rollers 32, which are attached to the modules, as shown for instance in FIG. 8.

In this embodiment, the arm guiding arrangement of the arm support arrangement 8 comprises the roller groove 33. As appears from FIG. 17, the roller groove 33 has a horizontal portion 33a and a curved portion 33b. The curved portion 33b curves upwards at a rear end of the horizontal portion 33a. When the arm 1 is retracted towards its storage configuration (as shown in FIG. 6), the curved portion 33b will force the modules 2 upwards and thus provide adjacent modules to pivot with respect to each other. The horizontal portion 33a is straight, and thus guides a straight portion of the arm 1.

The horizontal portion 33a of the roller groove 33 can in some embodiments provide sufficient support to the extended portion of the arm 1, so that the lower vertical guide wheel 21a (FIG. 7) can be omitted from the arm support arrangement 8. By omitting the lower vertical guide wheel 21a from the arm guiding arrangement, the arm 1 can be pulled a further distance into the arm storage arrangement 8. This is because the lower vertical guide wheel 21a will not collide with the gripping tool 20. In this way, a more compact robotic picking assembly 100 can be provided, with respect to horizontal extension when in the retracted storage mode.

In some embodiments according to the present invention, the length of the horizontal portion 33a of the roller groove 33 has a length that is less than 2.5 module lengths. Advantageously, the length of the horizontal portion is less than 3.5 module lengths. The module length is herein defined as the length between two adjacent pivot axes of two adjacent, connected arm modules 2 of the arm 1.

Figure 18:
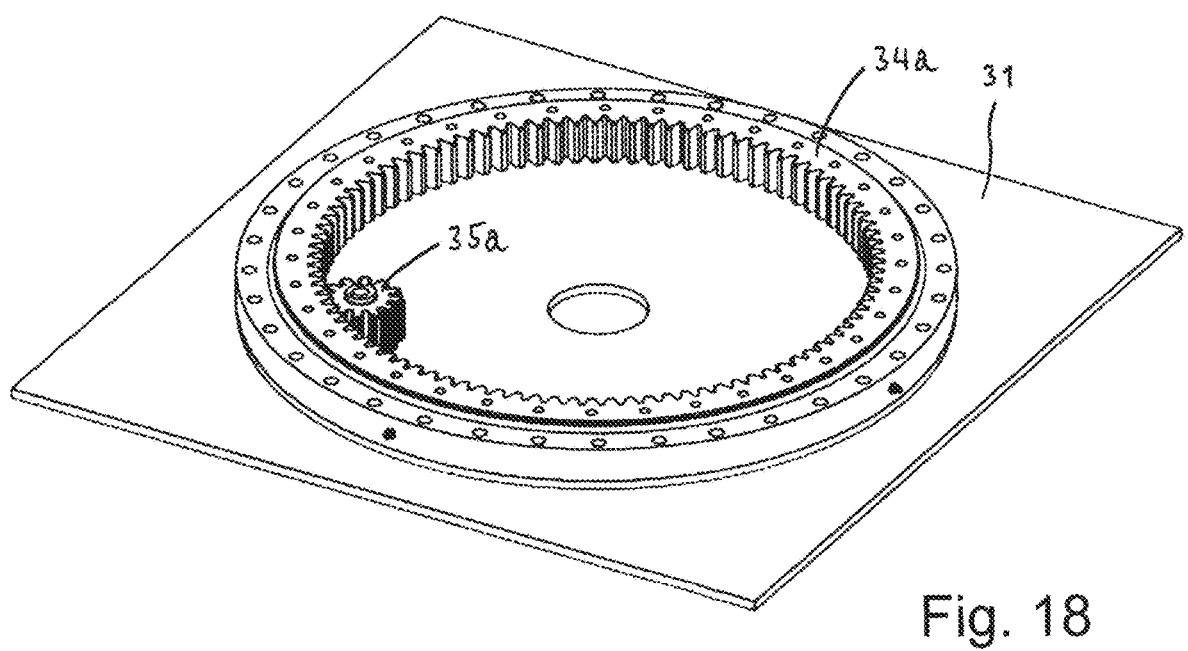
FIG. 18 is a perspective view of an alternative embodiment of the present invention.

FIG. 18 depicts an alternative solution for rotation of the tower 30, which was shown in FIG. 9. While the embodiment shown in FIG. 9 has a base plate 34 with a toothed circular perimeter, the embodiment shown in FIG. 18 has a base plate ring 34a where the teeth are facing inwards from an internal circular face. A toothed rotation drive wheel 35a, which is driven by a rotation motor 35, engages the teeth of the base plate ring 34a. The tower 30 (not shown) is attached to the base plate drive ring 34a, and thus rotates upon actuation of the rotation motor 35.

The example discussed above relates to an embodiment where the arm 1 is configured to curve in an upward direction. In other embodiments, the arm 1 can be supported in such way that it curves in a sideway direction. In such embodiments, it will curve and extend along a substantially horizontal plane. By arranging the arm support arrangement 8 in such a manner, i.e. to curve the arm along a horizontal plane, the assembly 100 will need less space vertically above it. Hence, it may then be suited to work close to a ceiling inside a building.

FIG. 19, FIG. 20 and FIG. 21 depict an alternative embodiment a vertical movement arrangement, configured to move the arm support arrangement 8 vertically. As with the embodiments discussed above, there is arranged tower 30 that supports the arm support arrangement 8 (not shown in these figures). Advantageously, the tower 30 can be mounted on a rotating base plate 34, as in the previous embodiments.

In this embodiment, the tower 30 comprises a plurality of tower modules 30b that are telescopically movable with respect to each other. As appears from the drawings, in the situation shown in FIG. 19 and in FIG. 20, the telescopic tower 30 is in the vertically extended position. The arm support 8 is omitted in these drawings for simplicity but would typically be fixed to the uppermost tower module 30b.

FIG. 21 is a cross section side view illustrating the tower 30 in the vertically lower position. To move the uppermost tower module 30b vertically, a vertical drive arrangement 60 is arranged. In this embodiment, the vertical drive arrangement 60 can be a rigid chain actuator. The rigid chain actuator 60 comprises a chain drive wheel 61 that engages with a chain 63. The chain 63 can take a straight and rigid configuration and is fixed to the uppermost tower module 30b. By rotating the chain drive wheel 61, typically with a vertical motor 36, the tower 30 can thus be extended and retracted in the vertical direction.

An advantage of this type of tower, is that the chain drive wheel 61 and the chain 63 is enclosed inside the tower 30 itself. In this way, these parts are less exposed to impurities and personnel will be less exposed to hazard by the these moving parts.

Advantageously, the horizontal cross section of the tower modules 30b exhibits a rectangular shape. This improves stability of the tower 30.

An alternative definition of the present invention is presented in the following. According to a second aspect of the invention, there is provided a modular extendable arm 1 comprising a plurality of identical arm modules 2 linked together in a chain, wherein each module comprises a module body 3 with mainly flat upper 11, lower 12 and side surfaces 13, 14 being parallel with the central axis of the module. Pivot means 4 between each two consecutive modules provides relative angular movement in an upward direction from an initial horizontal position. Furthermore, pivot restriction means 18, 19 between each two consecutive modules preventing relative angular movement in a downward direction from an initial horizontal position. An arm guide orifice 6 holds the arm 1 in a mainly horizontal position. An arm drive 7 can move the arm in and out in the guide orifice 6. The modular extendable arm further comprises an arm storage system 8 for the part of the arm which is not extended past the guide orifice.

According to an embodiment of the second aspect of the invention, the pivot means comprises a rear hinge structure 9 and a mating front hinge structure 10 located at respective rear 15 and front 16 end surfaces of the module body with a hinge bolt 17 going there through, wherein the hinge structures are at the same distance from the upper surface.

The invention claimed is:

1. A robotic picking assembly comprising:
   an arm support arrangement configured to move vertically and to rotate about a vertical axis;
   a horizontally extendable arm supported in the arm support arrangement;
   a gripping tool arranged at a free end of the horizontally extendable arm;
   wherein the horizontally extendable arm comprises a plurality of arm modules linked together in a chain, and wherein the plurality of arm modules comprise:
     a hinge linking adjacent arm modules together in a pivoting manner; and
     a pivot restriction means limiting curving of the horizontally extendable arm to only one direction;
   wherein the arm support arrangement comprises:
     an arm guiding arrangement configured to guide the horizontally extendable arm between an extended position and a retracted position;
     an arm drive arrangement configured to move the horizontally extendable arm between said extended and retracted positions; and
     wherein when the horizontally extendable arm is in the retracted position, a portion of the horizontally extendable arm exhibits an upwardly curved shape, extending upwards from a horizontal portion of the horizontally extendable arm, between the free end and a back end, wherein the back end of the horizontally extendable arm is fixed to an end unit of the arm support arrangement.

2. The robotic picking assembly according to claim 1, wherein in the retracted position, the horizontally extendable arm curves at least 180 degrees, preferably at least 270 degrees.

3. The robotic picking assembly according to claim 1, wherein in the retracted position, the horizontally extendable arm curves less than 360 degrees, preferably less than 280 degrees.

4. The robotic picking assembly according to claim 1, wherein the plurality of arm modules comprise a pitch rack and the arm drive arrangement comprises a motorized cogwheel engaging the pitch rack.

5. The robotic picking assembly according to claim 1, wherein the plurality of arm modules comprise an umbilical channel and that an umbilical extends through the umbilical channel to the free end of the horizontally extendable arm.

6. The robotic picking assembly according to claim 1, wherein the back end of the horizontally extendable arm is fixed to the end unit of the arm support arrangement in a vertical orientation.

7. The robotic picking assembly according to claim 1, wherein the plurality of arm modules comprise a stabilizing protrusion at one end and a stabilizing groove at an opposite end, wherein the stabilizing groove is configured to receive the stabilizing protrusion of an adjacent arm module.

8. The robotic picking assembly according to claim 1, wherein the pivot restriction means comprises a rear abutment surface and a front abutment surface, which are configured to abut against each other when adjacent arm modules are in a straight configuration.

9. The robotic picking assembly according to claim 1, wherein the arm guiding arrangement comprises a lower vertical guide wheel supporting the horizontally extendable arm from below and an upper vertical guide wheel supporting the horizontally extendable arm from above, wherein the lower vertical guide wheel is arranged closer to the free end than what the upper vertical guide wheel is when the horizontally extendable arm is in the extended position.

10. The robotic picking assembly according to claim 1, wherein the plurality of arm modules are provided with module rollers configured to engage a roller groove of the arm support arrangement.

11. The robotic picking assembly according to claim 1, wherein the arm support arrangement comprises a roller groove and that the plurality of arm modules comprise pairs of module rollers, wherein a horizontal portion of the roller groove engages the pairs of module rollers, so that a weight of an extended portion of the horizontally extendable arm, as well as the weight of a carried item held by the gripping tool, is carried by an engagement between the horizontal portion and the pairs of module rollers.

12. The robotic picking assembly according to claim 1, wherein the arm guiding arrangement comprises a roller groove having a horizontal portion and a curved portion that curves upwards with respect to the horizontal portion.

13. The robotic picking assembly according to claim 12, wherein a length of the horizontal portion is less than 2.5 module lengths, preferably less than 3.5 module lengths.

14. The robotic picking assembly according to claim 1, wherein the plurality of arm modules comprise a box-shaped module body with two opposite and parallel side walls, and a substantially flat lower surface.

15. The robotic picking assembly according to claim 1, wherein the arm drive arrangement has not more than one electric arm drive motor configured for moving the horizontally extendable arm between the extended and retracted positions.

16. The robotic picking assembly according to claim 1, wherein when in the extended position, at least 50%, more preferably at least 70%, of a total number of the plurality of arm modules of the horizontally extendable arm are arranged along a common straight centerline.

17. The robotic picking assembly according to claim 1, wherein the horizontally extendable arm is without actuators or motors configured to move the horizontally extendable arm, as such actuators or motors are arranged external of the horizontally extendable arm.

18. The robotic picking assembly according to claim 1, further comprising:
  a vehicle structure with at least three wheels, configured to move the robotic picking assembly on a horizontal surface;
  a vertical movement arrangement configured to move the arm support arrangement vertically;
  a rotation arrangement configured to rotate the arm support arrangement about a vertical axis; and
  a pallet support arrangement configured to support a pallet.

19. The robotic picking assembly according to claim 1, wherein the plurality of arm modules comprise two abutting curve restriction faces configured to restrict curving of two adjacent arm modules beyond 90 degrees, preferably 75 degrees.

20. A computer-readable software embodied on a non-transitory medium and configured to control a robotic picking assembly according to claim 1, when run on a computer, as the software is configured to control:
  the arm drive arrangement;
  a rotation motor configured to rotate the arm support arrangement about a vertical axis;
  a vertical motor configured to move the arm support arrangement vertically; and
  a vehicle structure configured to move the robotic picking assembly on a horizontal surface.

* * * * *

UNITED STATES PATENT AND TRADEMARK OFFICE
CERTIFICATE OF CORRECTION

PATENT NO. : 12,042,932 B2
APPLICATION NO. : 16/769540
DATED : July 23, 2024
INVENTOR(S) : Olivier Roulet-Dubonnet et al.

It is certified that error appears in the above-identified patent and that said Letters Patent is hereby corrected as shown below:

In the Claims

Claim 1, Column 12, Lines 17-25

Replace "a pivot restriction means limiting curving of the horizontally extendable arm to only one direction;
wherein the arm support arrangement comprises:
an arm guiding arrangement configured to guide the horizontally extendable arm between an extended position and a retracted position;

an arm drive arrangement configured to move the horizontally extendable arm between said extended and retracted positions; and"

With --a pivot restriction means comprising an abutment surface and limiting curving of the horizontally extendable arm to only one direction;
wherein the arm support arrangement comprises:
an arm guiding arrangement comprising a guide wheel and configured to guide the horizontally extendable arm between an extended position and a retracted position; and an arm drive arrangement comprising a motor and configured to move the horizontally extendable arm between said extended and retracted positions; and--

Claim 18, Column 14, Lines 13-18

Replace "a vertical movement arrangement configured to move the arm support arrangement vertically;
a rotation arrangement configured to rotate the arm support arrangement about a vertical axis; and
a pallet support arrangement configured to support a pallet."

Signed and Sealed this
Twenty-seventh Day of August, 2024

*Katherine Kelly Vidal*

Katherine Kelly Vidal
*Director of the United States Patent and Trademark Office*

CERTIFICATE OF CORRECTION (continued)

U.S. Pat. No. 12,042,932 B2

With --a vertical movement arrangement comprising a motor and configured to move the arm support arrangement vertically; and a rotation arrangement comprising a motor and configured to rotate the arm support arrangement about a vertical axis.--